US012611714B2

(12) United States Patent
Kusaka

(10) Patent No.: US 12,611,714 B2
(45) Date of Patent: Apr. 28, 2026

(54) TITANIUM ALLOY LAMINATE MOLDED ARTICLE, AND MANUFACTURING METHOD AND RAW MATERIAL FOR SAME

(71) Applicant: JAMPT CORPORATION, Tagajo (JP)

(72) Inventor: Ryota Kusaka, Tagajo (JP)

(73) Assignee: JAMPT CORPORATION, Tagajo (JP)

( * ) Notice: Subject to any disclaimer, the term of this patent is extended or adjusted under 35 U.S.C. 154(b) by 498 days.

(21) Appl. No.: 18/018,733

(22) PCT Filed: Jun. 21, 2021

(86) PCT No.: PCT/JP2021/023301
§ 371 (c)(1),
(2) Date: Jan. 30, 2023

(87) PCT Pub. No.: WO2022/024582
PCT Pub. Date: Feb. 3, 2022

(65) Prior Publication Data
US 2023/0226611 A1 Jul. 20, 2023

(30) Foreign Application Priority Data
Jul. 30, 2020 (JP) ................................. 2020-129044

(51) Int. Cl.
| | |
|---|---|
| *B22F 10/28* | (2021.01) |
| *C22C 14/00* | (2006.01) |
| *B33Y 10/00* | (2015.01) |
| *B33Y 40/10* | (2020.01) |
| *B33Y 70/00* | (2020.01) |
| *B33Y 80/00* | (2015.01) |

(52) U.S. Cl.
CPC .............. *B22F 10/28* (2021.01); *C22C 14/00* (2013.01); *B22F 2202/11* (2013.01); *B22F 2301/205* (2013.01); *B22F 2304/10* (2013.01); *B33Y 10/00* (2014.12); *B33Y 40/10* (2020.01); *B33Y 70/00* (2014.12); *B33Y 80/00* (2014.12)

(58) Field of Classification Search
None
See application file for complete search history.

(56) References Cited

U.S. PATENT DOCUMENTS

2022/0127698 A1 4/2022 Chiba et al.

FOREIGN PATENT DOCUMENTS

| CN | 110983106 A | * | 4/2020 | ............ B22F 1/0081 |
|---|---|---|---|---|
| WO | 2020/158945 A1 | | 8/2020 | |

OTHER PUBLICATIONS

Jan. 31, 2023 International Preliminary Report on Patentability issued in International Patent Application No. PCT/JP2021/023301.

(Continued)

*Primary Examiner* — Anthony M Liang
(74) *Attorney, Agent, or Firm* — Oliff PLC

(57) ABSTRACT

Provided is a titanium alloy additive manufacturing product containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities, in which a pore content is less than 0.02 number/mm$^2$.

4 Claims, 2 Drawing Sheets

(56)         References Cited

OTHER PUBLICATIONS

Aug. 31, 2021 International Search Report issued in International Patent Application No. PCT/JP2021/023301.

Adachi, Mitsuru et al., "Formation of light metal using additive manufacturing method", Journal of The Japan Institute of Light Metals, vol. 66, No. 7, pp. 360-367, 2016.

Shui, Xiaoli et al., "Effects of post-processing on cyclic fatigue response of a titanium alloy additively manufactured by electron beam melting", Materials Science & Engineering A, vol. 680, pp. 239-248, 2017.

Morokoshi, Shotaro et al., "Mechanical Properties of Ti-6A1-4V Materials Prepared by Additive Manufacturing Technology and HIP Process", J. Jpn. Soc. Powder and Powder Metallurgy, vol. 61, No. 5, pp. 250-254, 2014.

Gerling, R. et al., "Porosity and argon concentration in gas atomized y-TiA1 powder and hot isostatically pressed compacts", Materials Science and Engineering A, vol. 252, pp. 239-247, 1998.

Chen, G et al., "A pore morphological study of gas-atomized Ti-6A1-4V powders by scanning electron microscopy and synchrontron X-ray computed tomography", Powder Technology, vol. 330, pp. 425-430, 2018.

Chen, G et al., "A comparative study of Ti-6A1-4V powders for additive manufacturing by gas atomization, plasma rotating electrode process and plasma atomization", Powder Technology, vol. 333, pp. 38-46, 2018.

Cunningham et al., "Analyzing the Effect of Powder and Post-Processing on Porosity and Properties of Electron Beam Melted Ti-6Al-4V," Materials Research Letters, Jun. 23, 2017, vol. 5, No. 7, pp. 516-525.

Aliprandi et al., "Tensile and Creep Properties Improvement of Ti-6Al-4V Alloy Specimens Produced by Electron Beam Powder Bed Fusion Additive Manufacturing," Metals, 2019, vol. 9, No. 1207, pp. 1-22.

Nov. 15, 2023 Extended Search Report issued in European Patent Application No. 21849536.4.

* cited by examiner (a)

COMPARATIVE EXAMPLE 2
FINE POWDER PROPORTION 3.3%

(b)

EXAMPLE 3
FINE POWDER PROPORTION 1.3%

(c)

EXAMPLE 1
FINE POWDER PROPORTION 0.5%

TITANIUM ALLOY LAMINATE MOLDED ARTICLE, AND MANUFACTURING METHOD AND RAW MATERIAL FOR SAME

TECHNICAL FIELD

The present invention relates to a titanium alloy additive manufacturing product having a high denseness and a high soundness degree without pressure leakage, and a method of manufacturing the same. In particular, the present invention relates to a titanium alloy additive manufacturing product which is a product as built by a metal additive manufacturing method and has a high soundness degree without being subjected to a hot isostatic pressing (HIP) treatment, and a method of manufacturing the same and a raw material therefor.

BACKGROUND ART

A titanium alloy has a high tensile strength while being lightweight and thus has been widely used in an aircraft part and the like. In this case, the titanium alloy is usually subjected to processing such as rolling after being cast.

On the other hand, a metal additive manufacturing method has recently attracted attention as a method of manufacturing a product having a final shape by using a metal powder as a raw material, spreading the metal powder layer by layer, irradiating the metal powder with a laser or an electron beam, and heating, dissolving, and solidifying only a specific part without using a mold.

The titanium alloy is also an alloy suitable for such a metal additive manufacturing method, and an additive manufacturing product obtained by the metal additive manufacturing method exhibits a high tensile strength equal to or higher than that of a molded body obtained by casting and rolling without rolling or the like (see Non Patent Literature 1).

In a case where a metal powder/plasma atomized powder manufactured by Arcam AB is used as a raw material and a metal additive manufacturing product is formed by irradiation with an electron beam, a fatigue strength of a material as additive manufactured (as built) without being subjected to a treatment is low. However, it has been reported that the high-quality properties can be obtained and the fatigue strength can be improved by subjecting the material as additive manufactured to the HIP treatment (see Non Patent Literature 2).

In addition, it has been reported that the fatigue strengths ($10^7$ cycles) of the materials as additive manufactured of the additive manufacturing product obtained by an electron beam method using a plasma atomized powder and a laser method using a gas atomized powder are 240 MPa and 300 MPa, respectively, which are low, but a pore (cavity) size decreases to about 1/50 by a HIP treatment, and both the fatigue strengths increase to 580 MPa (see Non Patent Literature 3).

Furthermore, in the metal powder obtained by the gas atomization method using argon gas (Free fall method/see Non Patent Literature 4, Plasma melting Induction Guiding Gas Atomization (PIGA) method/see Non Patent Literature 5), it is known that a proportion of particles having a higher pore volume ratio increases as a particle size of a powder particle increases, and a large amount of argon gas is contained in the pores.

In addition, in the metal powder generated by a rotating electrode method, it is known that the number of particles having pores is reduced as compared with the gas atomized powder and the plasma gas atomized powder, but the larger the powder particle size is, the larger the pore volume ratio is (for example, see Non Patent Literature 6).

These phenomena in the rapidly-solidified powders are considered to be due to the fact that a shape of a droplet is easily deformed as a particle size of the droplets scattered at the time of powder production is larger, and thus, the droplets are likely to wrap an inert gas present in the environment at the time of powder production.

A metal additive manufacturing product obtained by an electron beam or a laser using a typical atomized powder (hereinafter, when an atomized powder is described, it is a general term for a gas atomized powder, a plasma atomized powder, a centrifugal atomized powder, and the like) as a rapidly-solidified powder disclosed in the above non patent literatures generally exhibits excellent properties.

For example, the titanium alloy additive manufacturing product disclosed in Non Patent Literature 1 exhibits high tensile properties and high elongation equal to or higher than those of a rolled or forged material obtained by a manufacturing method according to the related art.

In addition, as for the tensile strength of the metal additive manufacturing product obtained using the atomized powder as a raw material described in each of Non Patent Literature 2 and Non Patent Literature 3, when comparing the material as additive manufactured and the HIP-treated material with each other, there is a large difference in tensile strength, yield strength, and elongation. That is, the HIP-treated material has no internal defects and has improved elongation but low tensile strength and yield strength as compared with the material as additive manufactured. In addition, since the HIP treatment is performed under a high temperature and a high pressure, a treatment cost of the additive manufacturing product is high, and thus, a product cost is high. Furthermore, it is known that when the HIP-treated material is heat-treated, the defects reduced by the HIP treatment expand again and the quality is deteriorated.

CITATION LIST

Non Patent Literature

Non Patent Literature 1: Mitsuru ADACHI et al., Light Metals, 66 (2016), 360-367

Non Patent Literature 2: Xiaoli Shui etc: Materials Science & Engineering A 680 (2017), 239-248

Non Patent Literature 3: Shotaro MOROKOSHI et al., Powder and Powder Metallurgy, 61 (2014), 250-254

Non Patent Literature 4: R. Gering etc: Materials Science & Engineering A 252 (1998), 239-247

Non Patent Literature 5: G. Chen etc: Powder Technology 330 (2018), 425-430

Non Patent Literature 6: G. Chen etc: Powder Technology 333 (2018), 38-46

SUMMARY OF INVENTION

Technical Problem

The present invention has been made from the above background. That is, since the metal additive manufacturing product has a rapidly-solidified structure, the metal additive manufacturing product exhibits a micro structure that cannot be obtained by a method according to the related art, and thus, a high value of the tensile strength is exhibited. In addition, a dense product is obtained. However, even in a case where a rapidly-solidified powder, for example, an atomized powder, is additive manufactured, in a thin product having a complicated shape, when pores are connected to each other in the metal additive manufacturing product, fatal air leakage defects occur when a denseness is required. When the HIP treatment is performed as a treatment therefor, the effect is enhanced. However, it is costly to perform the HIP treatment in order to bring the entire additive manufacturing product into a defect-free state, and the defects expand after the heat treatment. Therefore, it is desired to obtain high quality without performing the HIP treatment.

An object of the present invention is to provide a high-quality titanium alloy additive manufacturing product that does not require a HIP treatment and further enhances an inherently high soundness degree of the additive manufacturing product without pressure leakage at a low cost even when it is thin and has a completed shape, and a method of manufacturing the same and a raw material therefor.

Note that the soundness degree is a content of pores included in the metal additive manufacturing product per unit area. In addition, the HIP-treated material of the material as additive manufactured (as built) of the additive manufacturing product obtained using an atomized powder as a raw material has a high soundness degree, and has a typical number of defects per unit area of 0.01 number/mm$^2$ or less. A size thereof is a size on the order of 10 μm that can be enlarged and observed with an optical microscope.

Solution to Problem

A first aspect of the present invention is to provide a titanium alloy additive manufacturing product containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities, in which a pore content is less than 0.02 number/mm$^2$.

At least a part of the titanium alloy additive manufacturing product according to the first aspect may has a thin portion, and the pore content in at least the thin portion may be less than 0.02 number/mm$^2$. Note that a thickness of the thin portion is 3 mm or less, and more specifically 0.5 mm or more and 3 mm or less.

A second aspect of the present invention is to provide a method of manufacturing a titanium alloy additive manufacturing product, the method including additive manufacturing a titanium alloy powder in which a proportion of fine powders of 45 μm or less is less than 2% by a metal additive manufacturing method, the titanium alloy powder containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities.

In the method of manufacturing a titanium alloy additive manufacturing product according to the second aspect of the present invention, a particle size of the titanium alloy powder can be 250 μm or less.

A third aspect of the present invention is to provide a titanium alloy powder for manufacturing a titanium alloy additive manufacturing product, the titanium alloy powder containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities, in which a proportion of fine powders of 45 μm or less is less than 2%.

A particle size of the titanium alloy powder according to the third aspect of the present invention can be, for example, 250 μm or less.

Advantageous Effects of Invention

According to the present invention, there are provided a high-quality thin titanium alloy additive manufacturing product (for example, 3 mm or less) that does not require a HIP treatment without pressure leakage at a low cost while taking advantage of the characteristics of the additive manufacturing product having a high soundness degree, and a method of manufacturing the same.

In particular, according to the present invention, it is possible to obtain a titanium alloy additive manufacturing product exhibiting a soundness degree without pressure leakage similar to the HIP-treated material by suppressing the pore content to less than 0.02 number/mm$^2$ although it does not have almost no pores (a typical number of defects per unit area is less than 0.005 number/mm$^2$) as in the HIP-treated material.

In addition, according to the present invention, there is provided a method of manufacturing a titanium alloy additive manufacturing product exhibiting a soundness degree without pressure leakage even when it is a thin product having a thickness of 3 mm or less, by which it is possible to obtain a titanium alloy additive manufacturing product in which a pore content is suppressed to less than 0.02 number/mm$^2$ by additive manufacturing a titanium alloy powder in which a proportion of fine powders of 45 μm or less is less than 2% by a metal additive manufacturing method.

DESCRIPTION OF EMBODIMENTS

Figure 1:
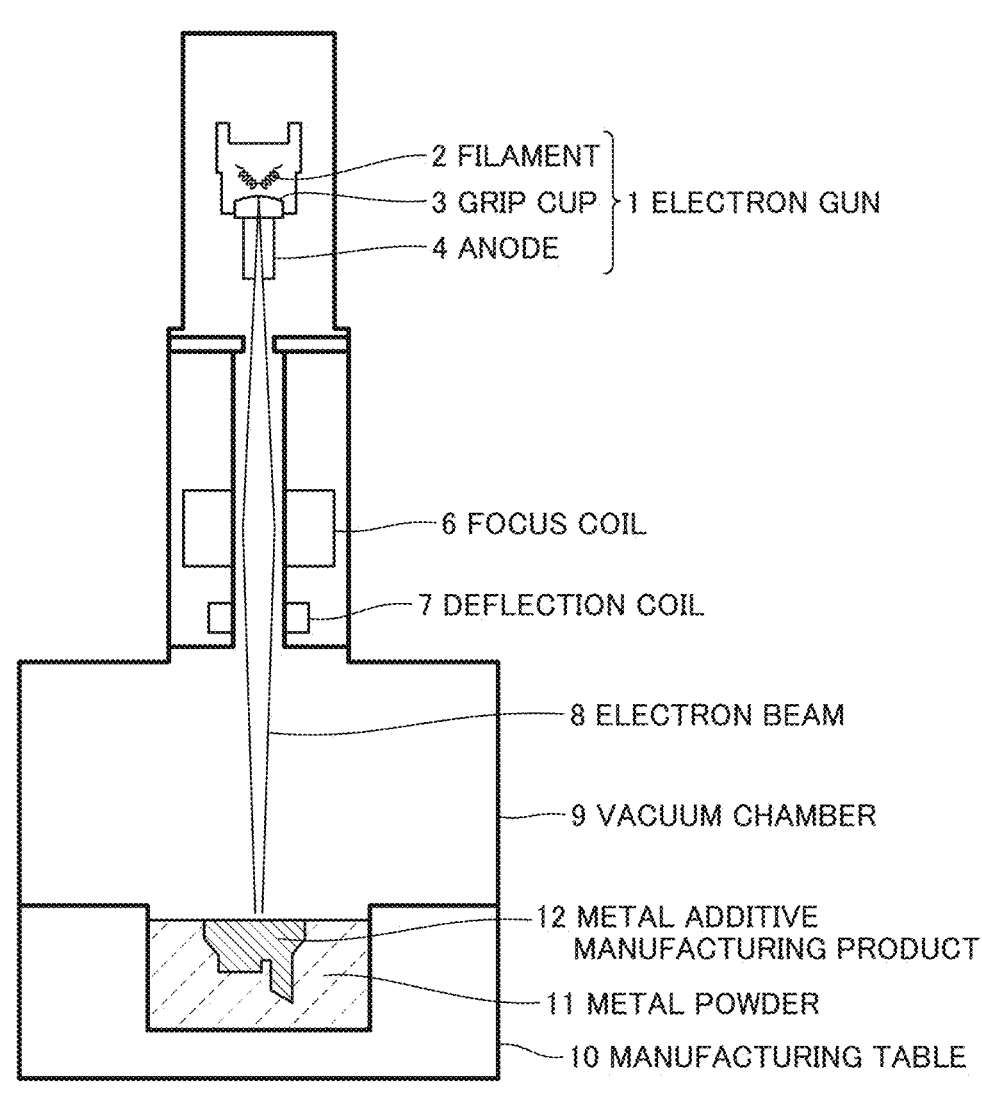
FIG. 1 is a view illustrating an electron beam additive manufacturing apparatus.

Hereinafter, embodiments of the present invention will be described in detail.

As described above, a metal additive manufacturing product has a rapidly-solidified structure and exhibits a microstructure that cannot be obtained by a method according to the related art. In addition, since a product having soundness with few pores can be obtained, a high tensile strength is exhibited.

Here, as the timing of the generation of the pores in the additive manufacturing product, the following two pores can be considered.

The time of generation of first pores is the time of the additive manufacturing. In this case, two more reasons are conceivable. First, a) it is considered that the pore is caused by an unmelted powder generated due to inappropriate additive manufacturing conditions. In this case, the pore is not merely one unmelted particle, but becomes a complicated and coarse pore. In addition, b) the pores may be generated due to entrained gas in a case of a laser method mainly using an inert gas in an environment in the apparatus. The pores of a) can be solved by appropriately setting additive manufacturing conditions at the time of additive manufacturing. The pores of b) can be solved by adopting an electron beam method in which gas entrainment is prevented because it is performed in a vacuum atmosphere.

The time of generation of second pores is before additive manufacturing. Pores are already present in the raw material powder obtained by the atomization method. The gas wrapped in the droplets scattered at the stage of producing the raw material powder is entrained in the powder, and once the gas is entrained, the gas enters the additive manufacturing product regardless of the presence or absence of the additive manufacturing conditions. It is easy to understand that it is important to manage powders with having a large particle size in order to reduce adverse effects of such gas entrainment and to manufacture a dense and high-quality additive manufacturing product.

However, according to the present invention, it has been unexpectedly found that not only an upper limit of the particle size of the powder is set, but also a mixing ratio of the fine powders is suppressed, in order to form an additive manufacturing product having soundness without pressure leakage in a thin portion of a material as additive manufactured instead of a high-quality additive manufacturing product obtained by subjecting the entire additive manufacturing product to a HIP treatment. That is, regardless of a method for producing the powder, suppressing the mixing ratio of the fine powders is effective in "improving the denseness" of the additive manufacturing product. The reason is probably that, even when gas pores included in the fine powders are small, the gas pores expand at the time of additive manufacturing in which the fine powders are melted and solidified, and the plurality of gas pores are connected to each other, thereby causing pressure leakage. In addition, in the additive manufacturing, the fine powders inhibit stable and uniform dissolution, which may promote generation of pores.

The present invention has found that in a powder obtained by a manufacturing method represented by a plasma atomization method or a rotating electrode method, which is used as a rapidly-solidified powder used for additive manufacturing, when a mixing ratio of fine powders of 45 μm or less is limited to less than 2%, it is effective in improving the denseness of the additive manufacturing product.

Note that even in the titanium alloy powder with few pores included in powder particles that is produced by a rotating electrode method, a mixing ratio of fine powders is limited, which is effective for improving the denseness and reducing the pressure leakage. When considering the repeat use of the powder, this is probably because fine powders of 45 μm or less in the air atmosphere may cause defects caused by an increase in oxide film due to an increase in specific surface area.

A titanium alloy additive manufacturing product according to an embodiment of the present invention is obtained by additive manufacturing a titanium alloy powder. As an additive manufacturing method, a powder bed fusion method can be used. The powder bed fusion method is an additive manufacturing method in which a raw material metal powder is spread layer by layer, the raw material metal powder is irradiated with an electron beam, and only a specific part is dissolved and solidified.

The obtained additive manufacturing product has a composition containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities.

The titanium alloy additive manufacturing product has a pore content of less than 0.02 number/mm$^2$. When the pores having a pore content of more than 0.02 number/mm$^2$ are present in the additive manufacturing product, the pores are easily connected to each other, such that a density is decreased, and a pressure leakage defect occurs in a thin additive manufacturing product. Note that the term "thin" is defined as a "thin product" or a "thin portion" of 3 mm or less, and more specifically 0.5 mm or more and 3 mm or less. For this reason, in at least a part of the additive manufacturing product having a thin portion of 0.5 mm or more and 3 mm or less, it is required to set a pore content in at least the thin portion to less than 0.02 number/mm$^2$. In a portion where a thickness of the additive manufacturing product exceeds 3 mm, the pressure leakage does not occur even when the pore content exceeds 0.02 number/mm$^2$. On the other hand, in a product having a thickness of less than 0.5 mm, even when a pore content is less than 0.02 number/mm$^2$, it is not easy to manufacture a product with no pressure leakage with a currently commercially available apparatus. Therefore, a range of a product thickness for obtaining an additive manufacturing product with no pressure leakage by limiting the pore content is set to 0.5 mm or more and 3 mm or less.

A method of manufacturing a titanium alloy additive manufacturing product according to a second embodiment of the present invention includes additive manufacturing a titanium alloy powder by a metal additive manufacturing method. The titanium alloy powder used as a raw material has a composition containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities.

In addition, a proportion of the fine powders of 45 μm or less in the titanium alloy powder as a raw material is less than 2%.

Not only pores easily included in coarse powders in the titanium alloy powder but also fine powders of 45 μm or less cannot be ignored, and a proportion thereof is a factor having a large influence on the density after metal additive manufacturing. The pores in the titanium alloy powder according to the related art are present as they are also in the additive manufacturing product formed by additive manufacturing the titanium alloy powder. Accordingly, when the proportion of the fine powders of 45 μm or less in the titanium alloy powder exceeds a certain value, the pores in the additive manufacturing product are connected to each other, which causes pressure leakage. Therefore, the proportion of the fine powders of 45 μm or less in the titanium alloy powder is less than 2>.

As described above, the content of the fine powders in the titanium alloy powder has already been described above from the viewpoint of the quality of the additive manufacturing product, but in addition to the quality, in a case of an electron beam additive manufacturing apparatus, since the atmosphere in the apparatus is a vacuum, it is also considered to prevent the titanium alloy powder from being sucked into the apparatus, which causes failure of a vacuum system of the apparatus.

On the other hand, more pores are entrained in the powder as the powder becomes larger during powder production. Therefore, the maximum particle size is preferably 250 μm and more preferably 150 μm. In addition, a surface roughness of the additive manufacturing product becomes coarser as the particle size of the titanium alloy powder particle is larger, and in this sense, the maximum particle size of the titanium alloy powder particle is preferably 250 μm and more preferably 150 μm.

The titanium alloy powder described above is additive manufactured by a metal additive manufacturing method, and examples of the metal additive manufacturing method include an electron beam additive manufacturing method and a laser additive manufacturing method.

In general, the electron beam additive manufacturing method is used and performed by the following steps using an electron beam additive manufacturing apparatus illustrated in FIG. 1.

(1) One metal powder layer having a constant thickness is spread.

(2) A location to be solidified of the metal powder layer is locally irradiated with an electron beam to heat the powder layer, and the powder is instantaneously solidified while being instantaneously melted. In this case, the electron beam is scanned based on 3D data and slice data.

(3) A manufacturing table is lowered, and the metal powder layer is further spread.

(4) The above steps are repeated to sequentially additive manufacture a metal so as to obtain an additive manufacturing product having a final shape, and then, an unsolidified powder is removed to obtain an additive manufacturing product.

By subjecting the titanium alloy powder to the above steps, a titanium alloy additive manufacturing product having a predetermined shape can be obtained.

The electron beam additive manufacturing apparatus has a structure illustrated in FIG. 1 and includes an electron gun 1, a focus coil 6, a deflection coil 7, and a vacuum chamber 9, and the inside of the apparatus is maintained in vacuum. The electron gun 1 includes a filament 2 that emits electrons, a grid cup 3 that extracts the electrons, and an anode 4 that accelerates the electrons.

In the electron gun 1, the electrons are extracted from the filament 2 heated to 2,500° C. or higher by the grid cup 3, the electrons are accelerated to half the speed of light after passing through the anode 4, and one layer of metal powder 11 is irradiated with an electron beam 8. The metal powder 11 is, for example, a titanium powder having a particle size of 65 μm, and is accommodated in a manufacturing table disposed in the vacuum chamber 9. At this time, the electron beam 8 is focused on the metal powder 11 by the focus coil 6, and is scanned into a predetermined shape based on 3D data and slice data by the deflection coil 7.

When the layered metal powder 11 is irradiated with the electron beam 8, kinetic energy thereof is converted into heat, and the metal powder is heated and melted by the heat, and then rapidly solidified. The layered metal powder 11 is further spread thereon, the same steps are repeated to add the metal, and a final product having a predetermined shape is formed.

Examples

Hereinafter, Examples of the present invention will be described in comparison with Comparative Examples.

Ti-6% Al-4% V titanium alloy powders having a particle size of 30 μm to 210 μm produced by a rotating electrode method or a plasma atomization method were produced and classified into six types of titanium alloy powders having different content ratios of the amounts of fine powders of 45 μm or less by a classification treatment. Among them, powders in which proportions of fine powders of 45 μm or less were 0.51, 1.5%, and 1.3% were used in Examples 1, 2, and 3, respectively, and powders in which proportions of fine powders of 45 μm or less were 2.4%, 3.3%, and 4.2% were used in Comparative Examples 1, 2, and 3, respectively. Then, a first metal additive manufacturing product of 20 mm×20 mm×20 mm for observing the amount of pores generated and a second metal additive manufacturing product for evaluating pressure leakage were formed using these six types of titanium alloy powders by an electron beam additive manufacturing method.

Note that the second metal additive manufacturing products were used as the following four types of tubular additive manufacturing products.

Figure 2:
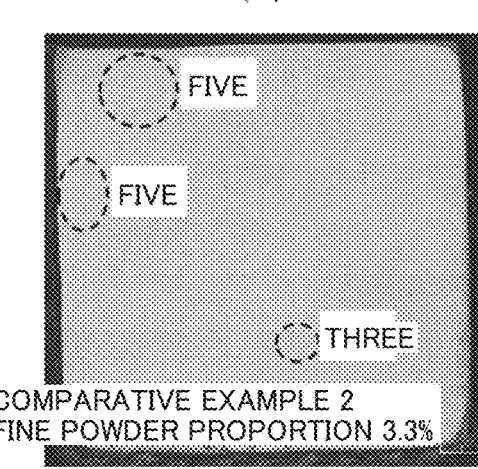
FIG. 2 is a view illustrating a presence state of pores.
Figure 2:
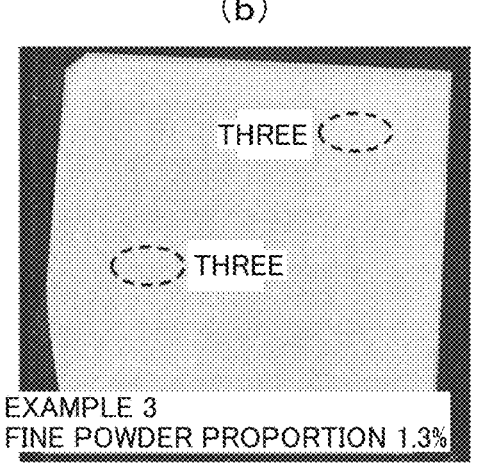
Figure 2:
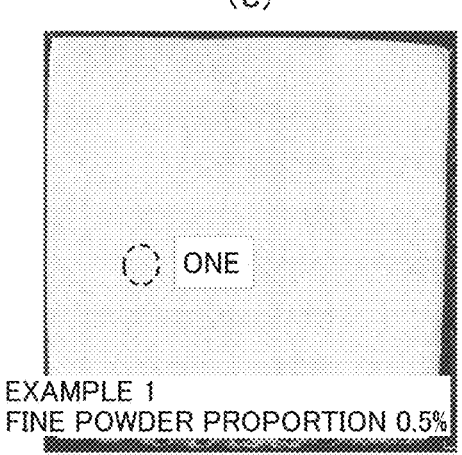
Figure 3:
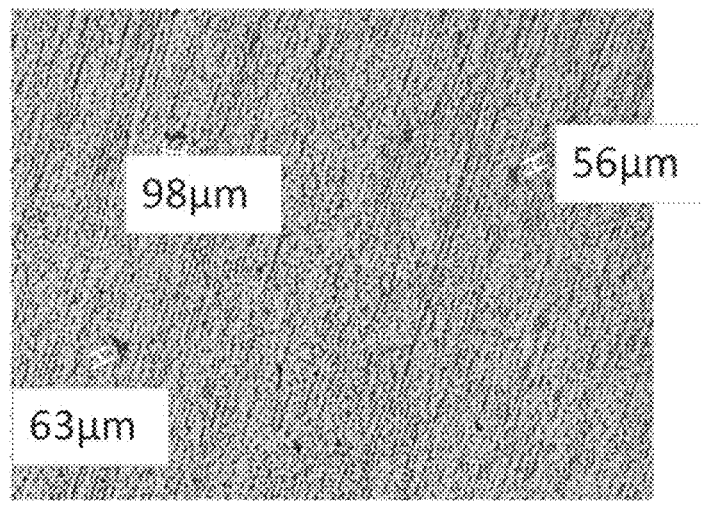
FIG. 3 is a view illustrating pores observed on a polished surface.

(1) Total length: 100 mm, outer diameter: 18 mm, inner diameter: 13 mm, thickness: 2.5 mm (2) Total length: 100 mm, outer diameter: 16 mm, inner diameter: 10 mm, thickness: 3 mm (3) Total length: 100 mm, outer diameter: 18 mm, inner diameter: 10 mm, thickness: 4 mm (4) Total length: 100 mm, outer diameter: 18 mm, inner diameter: 16.8 mm, thickness: 0.6 mm Among the pores appearing in the first metal additive manufacturing product, as illustrated in FIG. 3, cavities of 50 μm or more were counted as pores that lower the soundness degree of the metal additive manufacturing product. As a result, thirteen pores in Comparative Example 2, three pores in Example 3, and one pore in Example 1 were observed on an observation surface of 20 mm×20 mm of the first metal additive manufacturing product as illustrated in FIG. 2(*a*), FIG. 2(*b*), and FIG. 2(*c*), respectively.

In addition, regarding the pressure leakage, it was determined that the pressure leakage occurred when bubbles came out of water in a case where the tubular additive manufacturing product (second metal additive manufacturing product) having one end closed was placed in water, nitrogen gas of 1 MPa was sealed inside the additive manufacturing product, and pressure was applied for one minute.

The influence of the proportion of the fine powders on the soundness degree (pore content) of the metal additive manufacturing product obtained from the above observation results is shown in Table 1.

TABLE 1

| | | Proportion of fine powders of 45 μm or less (%) | Type of powder | Titanium alloy composition | Presence or absence of HIP treatment | Metal additive manufacturing method |
|---|---|---|---|---|---|---|
| Example | 1 | 0.5 | Rotating electrode powder | Ti—6Al—4V | Absence | Electron beam |
| | 2 | 1.5 | Rotating electrode powder | Ti—6Al—4V | Absence | Electron beam |
| | 3 | 1.3 | Plasma atomized powder | Ti—6Al—4V | Absence | Electron beam |

TABLE 1-continued

| | | | | | | |
|---|---|---|---|---|---|---|
| Comparative Example | 1 | 2.4 | Plasma atomized powder | Ti—6Al—4V | Absence | Electron beam |
| | 2 | 3.3 | Plasma atomized powder | Ti—6Al—4V | Absence | Electron beam |
| | 3 | 4.2 | Plasma atomized powder | Ti—6Al—4V | Absence | Electron beam |

| | Number of pores observed on polished surface of 20 mm square (400 mm²) Number | Soundness degree (pore content) Number/mm² | Presence or absence of pressure leakage in product having thickness of 4 mm | Presence or absence of pressure leakage in product having thickness of 3 mm | Presence or absence of pressure leakage in product having thickness of 2.5 mm | Presence or absence of pressure leakage in product having thickness of 0.6 mm |
|---|---|---|---|---|---|---|
| Example | 1 | 0.0025 | Absence | Absence | Absence | Absence |
| | 2 | 0.005 | Absence | Absence | Absence | Absence |
| | 6 | 0.015 | Absence | Absence | Absence | Absence |
| Comparative Example | 9 | 0.0225 | Absence | Presence | Presence | Presence |
| | 13 | 0.0325 | Absence | Presence | Presence | Presence |
| | 15 | 0.0375 | Absence | Presence | Presence | Presence |

The following is apparent from the results shown in Table 1.

First, in Examples 1 to 3 in which the proportions of the fine powders of 45 μm or less were 0.5%, 1.5%, and 1.3%, respectively, the soundness degrees (pore contents) of the first metal additive manufacturing products were 0.0025 number/mm², 0.005 number/mm², and 0.015 number/mm², respectively. In Examples 1 to 3, the pressure leakage did not occur in any of the second metal additive manufacturing products having thicknesses of 3 mm, 2.5 mm, 4.0 mm, and 0.6 mm.

The reason why the pore content in the metal additive manufacturing product was less than 0.02 number/mm², which was low, in Examples 1 to 3, is that in both the plasma gas atomized powder and the rotating electrode powder used as raw materials, the pore content was reduced to less than 2% by setting powder production conditions and performing a classification treatment on the fine powders of 45 μm or less.

On the other hand, in Comparative Examples 1 to 3 in which the proportions of the fine powders of 45 μm or less were 2.4%, 3.3%, and 4.2%, respectively, the pore contents of the first metal additive manufacturing products were 0.0225 number/mm², 0.0325 number/mm², and 0.0375 number/mm², which were all higher than 0.02 number/mm². As a result, the pressure leakage occurred in the second metal additive manufacturing products having thickness of 3 mm, 2.5 mm, and 0.6 mm. However, the pressure leakage did not occur in the second metal additive manufacturing product having a thickness of 4 mm.

From the above, it was found that in the metal additive manufacturing product formed of a titanium alloy having a thin portion having a thickness of 3 mm or less, more specifically, a thickness of 0.5 mm or more and 3 mm or less, the pressure leakage did not occur in the thin portion when the pore content was less than 0.02 number/mm².

In addition, it was found that the pressure leakage did not occur in the thin portion when the proportion of the fine powders of 45 μm or less included in the titanium alloy powder as a raw material was less than 2.0%.

Note that, in Examples described above, the metal additive manufacturing method using an electron beam is exemplified, but it goes without saying that the present invention can also be applied to the metal additive manufacturing using a laser beam.

The invention claimed is:

1. A method of manufacturing a titanium alloy additive manufacturing product, the method comprising additive manufacturing a titanium alloy powder wherein the titanium alloy powder includes fine powders with a particle size of 45 μm or less but a proportion of the fine powders of 45 μm or less that are present is less than 2% by a metal additive manufacturing method, the titanium alloy powder containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities.

2. The method of manufacturing a titanium alloy additive manufacturing product according to claim 1, wherein a particle size of the titanium alloy powder is 210 μm or less.

3. A titanium alloy powder for manufacturing a titanium alloy additive manufacturing product, the titanium alloy powder containing 5.50 to 6.75 wt % of Al, 3.50 to 4.50 wt % of V, 0.20 wt % or less of O, 0.40 wt % or less of Fe, 0.015 wt % or less of H, 0.08 wt % or less of C, 0.05 wt % or less of N, and inevitable impurities, wherein the titanium alloy powder includes fine powders with a particle size of 45 μm or less but a proportion of the fine powders of 45 μm or less that are present is less than 2%.

4. The titanium alloy powder according to claim 3, wherein a particle size of the titanium alloy powder is 250 μm-210 μm or less.

* * * * *